Jan. 8, 1935. W. W. OWER ET AL 1,987,578
MEASURING DISPENSING DEVICE
Filed Dec. 12, 1933
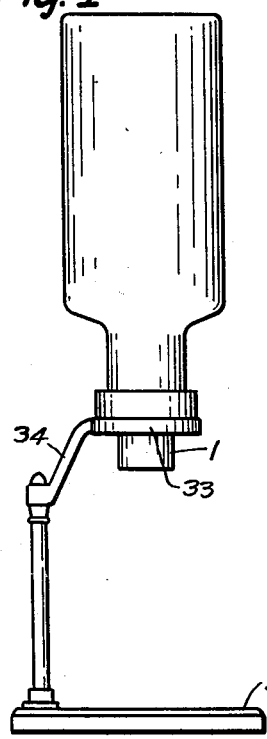
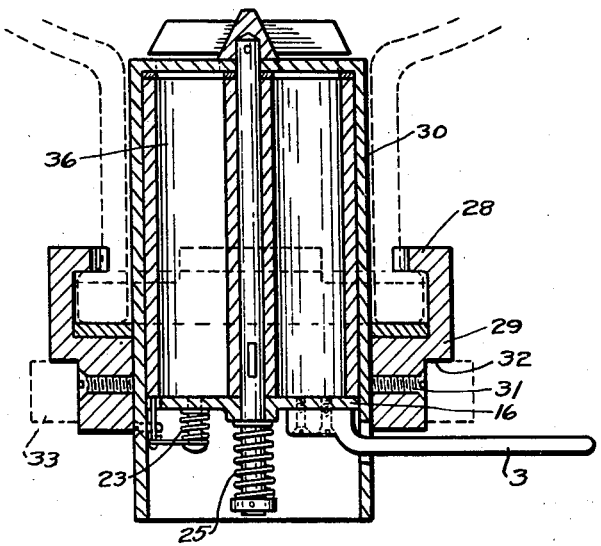
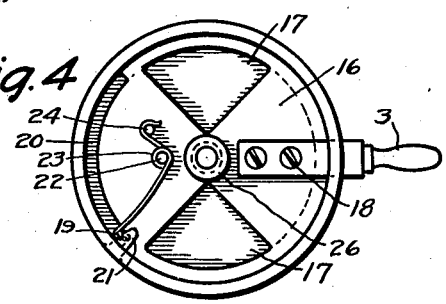
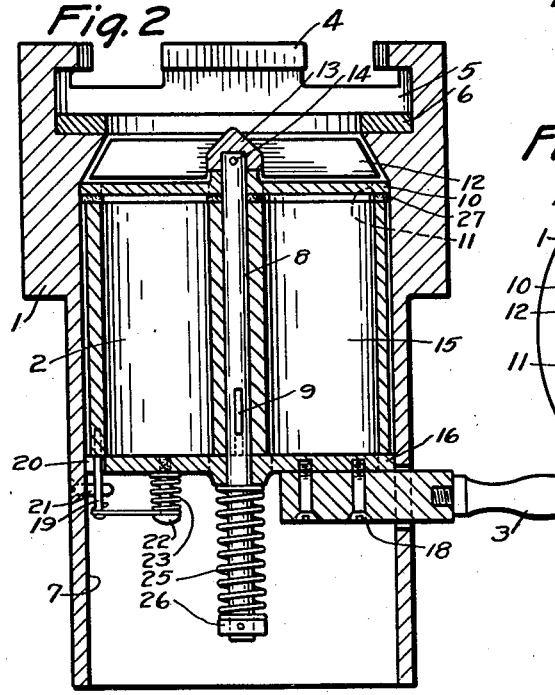
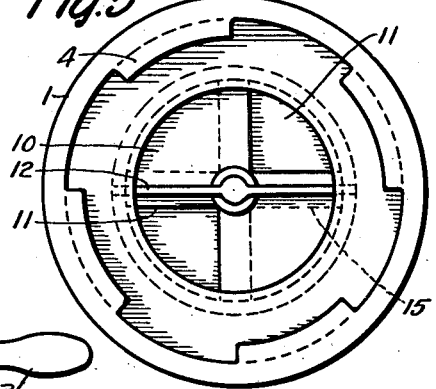
INVENTORS
William W. Ower
Mortimer L. Kobelin
James Harrison Bowen
ATTORNEY Patented Jan. 8, 1935

1,987,578

UNITED STATES PATENT OFFICE 1,987,578

MEASURING DISPENSING DEVICE

William W. Ower and Mortimer L. Kobelin, Englewood, N. J.

Application December 12, 1933, Serial No. 701,958

11 Claims. (Cl. 221—108)

The purpose of this invention is to provide a dispensing device which is particularly adapted for inverted bottles or containers that seals the bottle and which measures the amount dispensed with each operation.

The invention is a casing adapted to be attached to the neck of an inverted bottle having a closure at the upper end and another closure at the lower end in which both closures may be opened and closed by a common handle so that by moving the handle in one direction, the upper closure is opened to admit material to the device and when it is moved in the opposite direction, it will close the upper closure and open the lower closure so that the substance may drop or be expelled from the device.

Other devices of this nature have been provided for measuring and dispensing substances from containers, however, it has been found very difficult to seal the container and also to completely seal each end of the dispensing apparatus without making the device very elaborate or complicated.

The object of the invention is, therefore, to provide a simple and unique measuring and dispensing device which seals a container to which it may be attached and which also substantially seals the valve or closure openings at each end.

Another object is to provide a dispensing device which may be readily attached to a neck of a bottle or the like.

Another object is to provide a dispensing device which may fit upward into the neck of the bottle.

A further object is to provide a measuring and dispensing device which may be opened and closed by the same handle.

And a still further object is to provide a measuring and dispensing device which is of a simple and economical construction.

With these ends in view the invention embodies an outer casing having a closed upper end, a rotatable member in said casing having openings therein adapted to correspond with openings in the upper end of the casing when in a certain position, a closure at the lower end of the casing also having openings adapted to correspond with the openings in the rotatable member when in a certain position and means for operating the said closure and rotatable member to open and close the upper and lower ends of the device at different times.

Other features and advantages of the invention will appear from the following description taken in connection with the drawing, wherein:

Figure 1 is a view showing the device as it may be used with an inverted container resting therein.

Figure 2 is a vertical section thru the device showing the device mounted below the lower end of the container.

Figure 3 is a similar section snowing an alternate design in which the device is positioned inside of the neck of a bottle.

Figure 4 is a view looking toward the lower end of the device.

Figure 5 is a similar view looking downward upon the upper end of the device shown in Figure 2.

In the drawing the device is shown as it would be made wherein numeral 1 indicates an outer casing, numeral 2 a rotatable member, and numeral 3 a handle by which the device may be operated.

In the design shown in Figure 2 the outer casing 1 is made in the form of a cylinder with an enlarged upper end and jaws 4 are provided at the upper end which may be held on lugs on the outer surface of the neck of a bottle. Below the jaws 4 is a recess 5 and a gasket 6 may be placed in the lower end of the recess to engage the end of the bottle, which is shown in dotted lines in Figure 3. In the lower part of the casing 1 is a cylindrical opening 7 in which the rotatable member 2 is mounted and the member 2 is mounted upon a shaft 8 and secured thereto by a key 9. In the upper part of the casing is a stationary disc 10 having openings 11 therein and above this disc is a baffle plate 12 having a hub 13 in the center thereof which may be fixedly mounted on the shaft 8 by a pin 14. It will be noted that the members 2 and 12 will, therefore, rotate with the shaft whereas the member 10 will remain stationary. The member 2 is provided with vertical openings 15 which correspond with the openings 11, as shown in Figure 5, when the device is in the open position or with the upper end thereof open. Below the member 2 is another disc 16 also having openings 17 therein, corresponding with the openings 11 and 15 and positioned to register with the openings 15 when the member 2 is in such a position that the openings 15 do not register with the openings 11.

The handle 3 is attached to the lower side of the disc 16 by screws 18, however, it will be understood that it may be attached thereto in any manner and may be located at any point. It will be noted that the disc 16 is free to rotate on the shaft without turning the member 2, however, the member 2 is provided with a pin 19 which extends thru a slot 20 in the edge of the disc, as shown in Figures 2 and 4, and when the disc 16 is rotated in a clockwise direction, as shown in Figure 4, the end of the slot 20 will engage the pin 19 and thereby rotate the member 2 with the disc 16, whereas when the disc 16 is moved in a counter-clockwise direction from the position shown in Figure 4, the pin 19 will be held against a stop 21 and the disc 16 may be rotated without moving the member 2. It will, therefore, be noted that by moving the handle 3, first in a clockwise direction, the openings 15 in the member 2 may be moved to register with the openings 11 in the disc 10 so that material from the container may run into the member 2, and then when the handle is moved in the opposite direction the member 2 will remain stationary and the member 16 will be moved to such a position that the openings 17 will correspond with the openings 15 and thereby permit the substance to run out of the dispenser. The disc 16 is provided with a pin 22 having a coil spring 23 thereon with one end of the coil spring held over a pin 24 and the other held over the pin 19 and it will be noted that with this spring arranged in this manner it will return the pin with the cylinder 2 and also the disc 16 to the neutral position shown in Figure 4 in which the openings are closed. It will be appreciated that any other means may be used for holding this member in the neutral position and also that the spring may be arranged in any other manner, or any number of springs may be used. Another spring 25 may be placed on the lower end of the shaft 8 and held by a collar 26 and it will be noted that this spring will resiliently hold the member 16 against the lower end of the member 2 and at the same time hold the upper end of the member 2 against a gasket 27 that may be used between the upper end of the member 2 and the disc 10. It will be appreciated that these parts may be arranged in any other manner and any other means may be used for resiliently holding them in the sealed or closed position.

In the design shown in Figure 3 the device is arranged and operates in a similar manner except that the jaws which are indicated by the numeral 28 are positioned on the lower part of the casing and these are formed in a separate ring 29 which may be held to the outer shell 30, which forms the casing, by screws 31. The ring 29 is provided with a recess 32 which may be held in a ring 33 of a bracket 34 at the upper end of a stand 35, as shown in Figure 1. However, it will be appreciated that the device may be held or secured in the stand in any manner. In this design the member 2 and the upper and lower discs are arranged exactly the same as shown in Figure 2, however, the casing 30 and the member 36 which corresponds with the member 2 are made substantially longer in order to fit inside of the neck of the bottle. It will be understood that these parts may be made of any other shape or design and may be arranged in any manner in order to cooperate with bottles or containers of different types or designs.

It will be understood that other changes may be made in the construction of the device without departing from the spirit of the invention. One of which changes may be in the use of other means for holding the device in the casing, another may be in the use of other means for holding the casing in the bottle or container, another may be in the use of other means for operating the device, and still another may be in the use of other means for returning the device to the neutral position and holding it therein.

The construction will be readily understood from the foregoing description. In use the device may be provided as shown and described and it will be noted that it may be incorporated in or attached to the neck of a bottle or container and when properly installed, will completely seal the device. It will be noted that the device may be made of any size or the openings therein may be made to accommodate any desired amount or amounts of the substance from the bottle or container so that the device may dispense any amount desired. When it is desired to dispense some of the substance from the container the handle 3 may first be turned in one direction in order to permit the substance to pass from the container into the dispenser, and then turned in the opposite direction in order to permit the substance to pass from the dispenser into a glass, or the like. It will be understood that the device may be used for any purpose and may also be made to dispense liquids, powders, or any substance.

It will be understood that although this device is shown and described as used in combination with bottles, it may also be used with tin cans, or any other type of container or receptacle.

Having thus fully described the invention, what we claim as new and desire to secure by Letters Patent, is:

1. In a dispenser of the type having a cylindrical core with segmental openings therein, a casing, a valve formed by openings in the upper end of the casing registering with the segmental openings in the core, another valve at the lower end of the casing also formed by openings in a rotatable disc registering with the segmental openings of the core, means resiliently holding the core in the position of closing the valves, and means for operating said core and disc to open said valves.

2. A dispensing device as described in claim 1 in which the valve opening means operates each valve independently.

3. A dispensing device as described in claim 1 in which the valve opening means comprises a handle with a plate at the inner end adapted to move each valve member independently.

4. A dispensing device as described in claim 1 having means adapted to secure said device to the lower end of a container.

5. In a dispensing device as described in claim 1, means scraping the upper end of the casing.

6. In a dispensing device as described in claim 1, agitating means extending beyond the upper end of the casing and operated with the core.

7. The combination with a dispensing apparatus having a rotatable member with measuring chambers therein with a stationary closure having openings thru which a substance may pass into said chambers when the rotatable member is rotated to a predetermined position, a rotatable closure also having openings therein adapted to register with said measuring chambers, said rotatable member and closure operating independently and resiliently held with all openings closed.

8. A dispensing device comprising a rotatable measuring chamber having openings therein, a closure having openings therein adapted to admit a substance to one end of said chamber with the chamber positioned with openings therein registering with the openings in said closure and another closure movable independent of said chamber adapted to be operated to permit a substance in the chamber to drop from the lower end thereof, said chamber and movable closure operated independently and resiliently held with the openings in the chamber closed by the closures at both ends, said device adapted to be attached to a container with the container positioned to permit the contents thereof to pass into said measuring chamber.

9. In a dispensing device of the character described, an outer casing, an inner rotatable member having openings therein, openings in the upper end of the casing adapted to correspond with the openings in the inner rotatable member when the rotatable member is in a predetermined position, a closure adapted to close the lower ends of the openings of the inner rotatable member and also having openings therein adapted to be positioned to correspond with the openings of the inner rotatable member, when said inner rotatable member is so positioned that the openings therein do not correspond with the openings in the upper end of the casing, means operating said inner rotatable member and the closure at the lower end thereof, and means holding said device to a container, said operating means adapted to operate the closure at the lower end independent of said inner rotatable member.

10. A dispenser as described in claim 9 having means resiliently returning said operating parts to a position with the openings closed at both ends.

11. A dispenser as described in claim 9 in which all of the parts are operated by a common handle, and a common spring resiliently holds the parts in a closed position.

WILLIAM W. OWER.
MORTIMER L. KOBELIN.